UNITED STATES PATENT OFFICE.

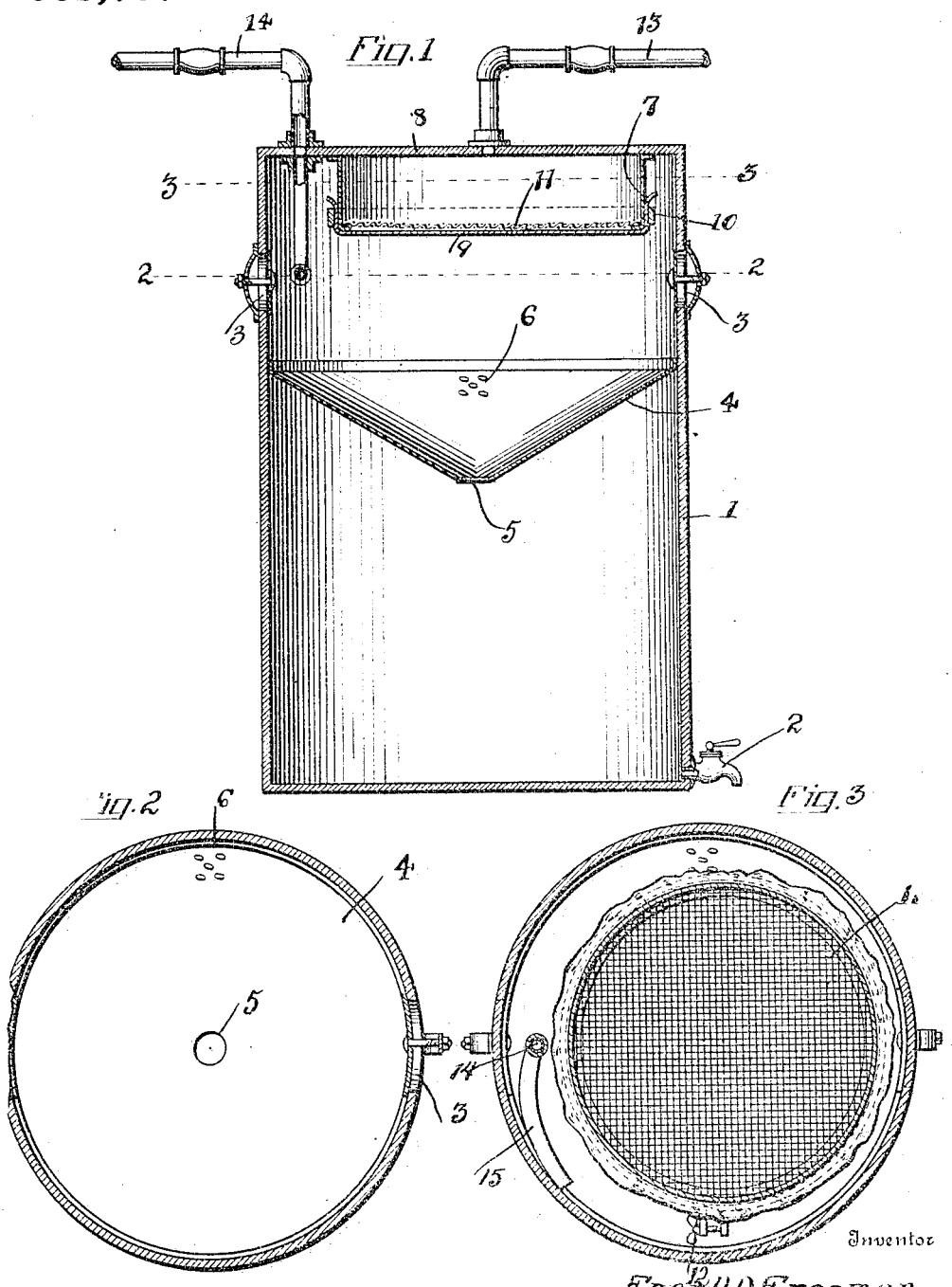

FRANK D. FREEMAN, OF MINOT, NORTH DAKOTA.

FILTER.

955,787.  Specification of Letters Patent.  Patented Apr. 19, 1910.

Application filed July 24, 1909. Serial No. 509,299.

*To all whom it may concern:*

Be it known that I, FRANK D. FREEMAN, a citizen of the United States, residing at Minot, in the county of Ward and State of North Dakota, have invented new and useful Improvements in Filters, of which the following is a specification.

The purpose of this invention is the provision of a device designed most especially for separating or removing the impurities from hydro-carbons such as gasolene, naphtha and the like, the device being of such construction as to admit of the operation being continuous and of access being readily had to the interior for cleaning or making necessary repairs.

The invention consists of the novel features, details of construction and combinations of parts which hereinafter will be more particularly set forth, illustrated in the accompanying drawings and pointed out in the appended claims.

Referring to the drawings forming a part of the specification: Figure 1 is a vertical central section of a filter or oil separator embodying the invention. Fig. 2 is a horizontal section on the line 2—2 of Fig. 1. Fig. 3 is a horizontal section on the line 3—3 of Fig. 1.

Corresponding and like parts are referred to in the following description and indicated in all the views of the drawings by the same reference characters.

The device comprises a tank or like receptacle 1 of any capacity and construction and provided at or near its lower end with a faucet 2 for drawing off the sediment such as water and heavy oil. Hand holes 3 are provided in the sides of the tank near the upper end to admit of access being had to the interior of the tank for removal of the filtering element and the replacement thereof or for any other purpose. A partition 4 is located in the upper portion of the tank and slopes downward toward a central point which is provided with an opening 5 to admit of the gasolene or other hydrocarbon passing into the lower portion of the tank. The partition 4 is connected at its outer edge to the inner walls of the tank and has a series of small openings 6 near its upper edge for the passage of the gasolene from the lower portion of the tank into the upper portion. The partition 4 acts as a preliminary separator to effect separation of water and heavy oil from the lighter gasolene or hydro-carbon.

A filtering device is located in the upper portion of the tank and is attached to the under side of the top and comprises a rim or band 7 pendent from the top 8 of the tank, a filtering element such as a diaphragm 9 stretched over the lower end of the rim or band 7, a clamp 10 for securing said diaphragm to the rim, and a reinforcement 11 attached to the rim or band 7 and located above the diaphragm 9. The clamp 10 may consist of a ring adapted to encircle the rim or band 7 and having its end portion out turned and connected by means of a set screw 12. The reinforcement 11 may consist of a piece of wire fabric which is soldered or otherwise attached to the rim or band 7. An outflow pipe 13 is connected with the top 8 of the tank and communicates with the interior of the filter. An inflow pipe 14 connects with the upper portion of the tank exterior to the filter and leads from a reservoir or other source of supply of gasolene, hydro-carbon or the like to be purified in its passage to the storage tank or other container.

The gasolene or other hydro-carbon or liquid to be purified is admitted into the upper portion of the tank 1 by means of the inflow pipe 14 and after being received upon the partition 4 is directed to the central out-let 5 and passes into the lower portion of the tank in which it rests and passes into the upper portion of the tank through the small opening 6. The water, heavy oil or the like contained in the gasolene is separated therefrom in the lower portion of the tank below the partition 4 and the lighter hydro-carbon passes by said partition 4 into the upper portion of the tank through the openings 6 of said partition. After the tank becomes filled, the lighter gasolene or hydrocarbon in the upper portion of the tank passes through the filtering device into the outflow pipe 13 when the valve controlling outlet thereof is open. The filtering diaphragm 9 preferably consists of chamois skin although any suitable hide or textile may be employed which will insure a thorough separation of the impurities from the gasolene.

It is observed that the pressure upon the separating or filtering diaphragm is from below, hence, the advantage of providing the wire fabric or reinforcement 11 which supports the diaphragm 9 against said pressure. So long as the in-flow and the out-flow pipes are open, the circulation and operation are continuous.

The in-flow pipe 14 extends into the space formed between the partition and the top of the receptacle and terminates at its inner lower end in a lateral extension 15 which curves in its length and terminates near the inner wall of the receptacle. The purpose of this construction is to impart to the gasolene or other hydro-carbon or liquid to be separated a whirling motion. The whirling motion imparted to the gasolene is sufficient to cause the heavier matter, such as heavy oils, water and the like to move outward and coming in contact with the downwardly inclined sides of the separating partition 4 move downward on said partition toward the central opening 5 by gravitative action whence they fall to the bottom of the tank to be drawn off from time to time by means of the faucet 2.

Having thus described the invention, what is claimed is:—

1. An oil separator comprising a tank provided in its lower portion with means for drawing off the precipitant and having a filter in its upper portion, an in-flow pipe connected with the upper portion of the tank exterior to the filter, an out-flow pipe leading from said filter, and a partition arranged in the upper portion of the tank and inwardly and downwardly sloped toward a central point at which an opening is formed, and said partition having a series of small openings near its upper outer edge.

2. In an oil separator, the combination of a tank, a filtering chamber in the upper portion of the tank, a filtering or separating diaphragm of textile closing the lower end of said filtering chamber, a wire fabric reinforcement extending over said separating diaphragm and secured to the filtering chamber, means for admitting a supply into the upper portion of the tank exterior to the filtering chamber, and an out-flow pipe leading from said filtering chamber.

3. An oil filter comprising a tank having a draw-off in its lower portion and provided in the sides near its upper end with hand holes, a partition arranged within the upper portion of the tank and having its middle-portion depressed and formed with an opening and having a series of small openings near its upper outer edge, a rim pendent from the top of the tank, a separating diaphragm stretched over and secured to the lower end of the rim, a reinforcement arranged above said diaphragm and connected with the upper portion of the tank exterior to the rim, the in-flow pipe continuing in a perpendicular position to about the center of the upper chamber, whence it turns at right angles running horizontal, starting parallel with the outer wall but declining toward it until it comes in contact with same, and an out-flow pipe connected with the top of the tank opposite the space inclosed by said pendent rim.

In testimony whereof I affix my signature in presence of two witnesses.

FRANK D. FREEMAN.

Witnesses:
C. B. DAVIS,
ARTHUR LE SUEUR.